Figure 1:
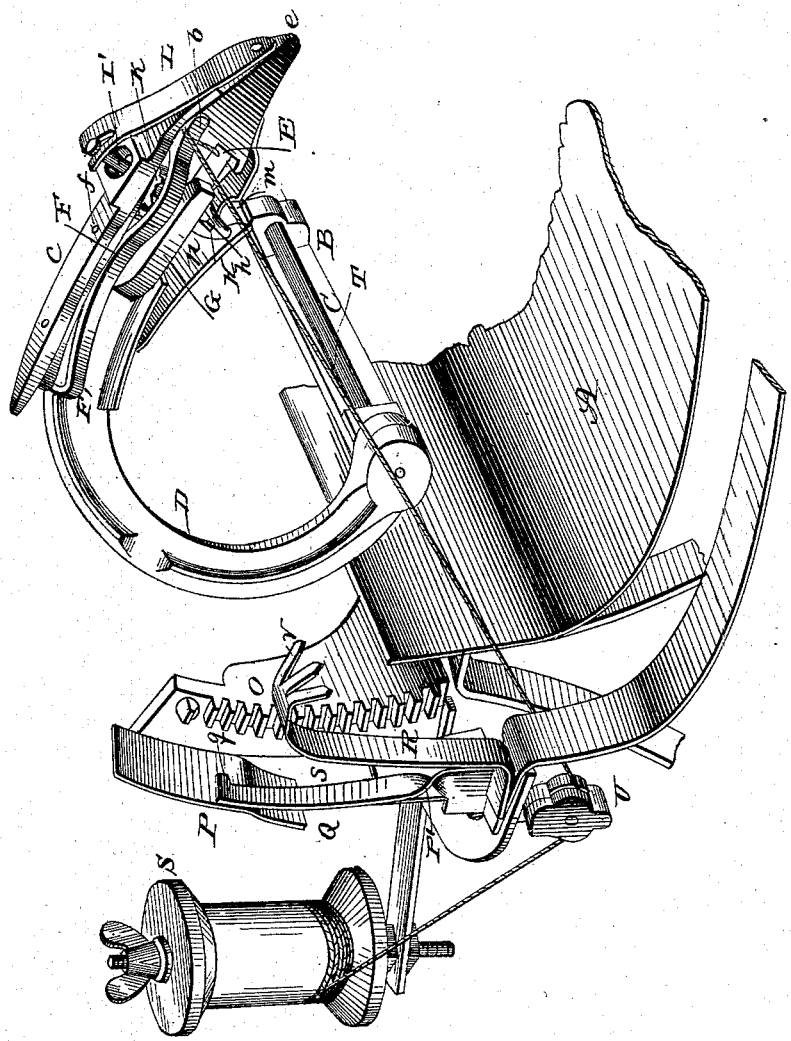

(Model.)

J. H. O'HARA.
GRAIN BINDER.

No. 272,150. Patented Feb. 13, 1883.

WITNESSES:
Fred. G. Dieterich
J. G. Hinkel

John H. O'Hara
INVENTOR,
by Louis Bagger & Co.
ATTORNEYS.

(Model.)
J. H. O'HARA.
GRAIN BINDER.
No. 272,150. Patented Feb. 13, 1883.
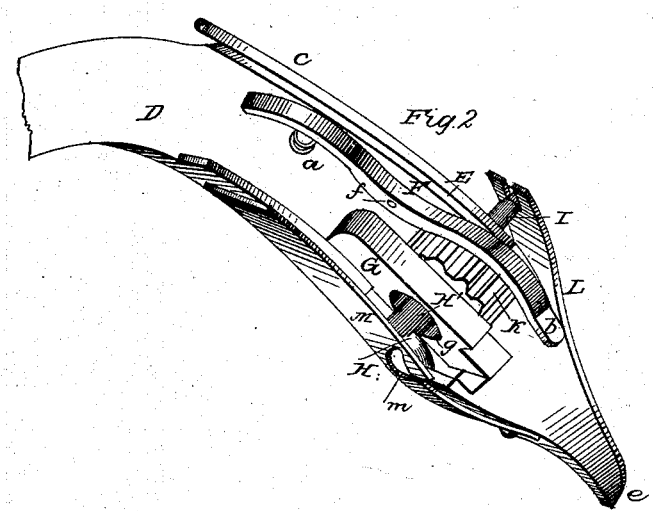
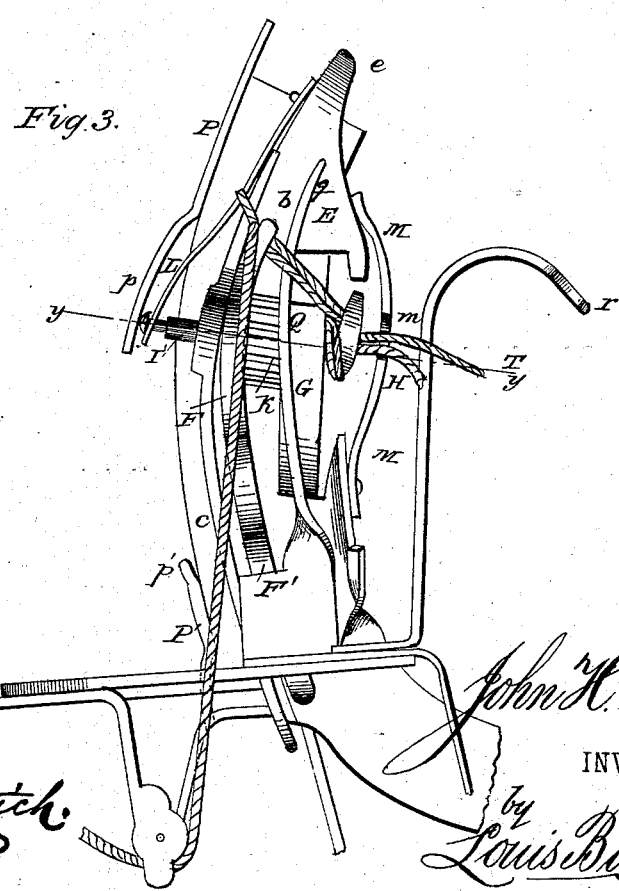
WITNESSES:
Fred. G. Dieterich
J. G. Hinkel
John H. O'Hara
INVENTOR.
by Louis Bagger & Co.
ATTORNEYS.

(Model.)
J. H. O'HARA.
GRAIN BINDER.
No. 272,150. Patented Feb. 13, 1883.
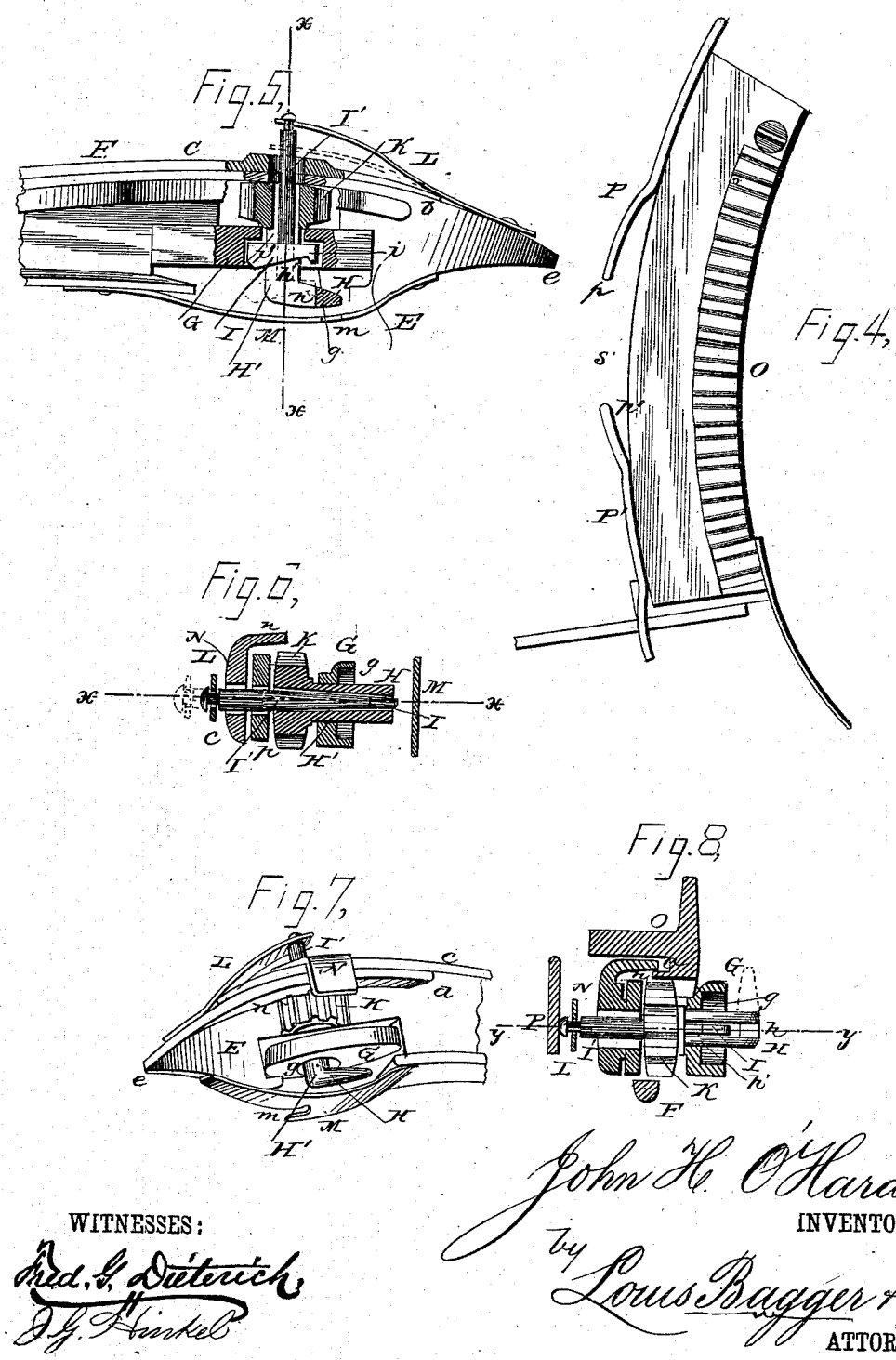
WITNESSES:
Fred. G. Dieterich
J. G. Hinkel
John H. O'Hara,
INVENTOR,
by Louis Bagger & Co,
ATTORNEYS.

UNITED STATES PATENT OFFICE.

JOHN H. O'HARA, OF THROOPSVILLE, NEW YORK.

GRAIN-BINDER.

SPECIFICATION forming part of Letters Patent No. 272,150, dated February 13, 1883.

Application filed August 15, 1882. (Model.)

*To all whom it may concern:*

Be it known that I, JOHN H. O'HARA, a citizen of the United States, residing at Throopsville, in the county of Cayuga and State of New York, have invented certain new and useful Improvements in Grain-Binders; and I do hereby declare that the following is a full, clear, and exact description of the invention, which will enable others skilled in the art to which it appertains to construct and use the same, reference being had to the accompanying three sheets of drawings, which form a part of this specification, and in which—

Figure 1 is a perspective view of so much of a grain-binder as involves my invention. Fig. 2 is a perspective detail view of one side of the head or needle on an enlarged scale. Fig. 3 is a detail view of the needle and its operating rack-bar, showing the position of the tying-cord on the tying device just before the cord is severed by the cutting device. Fig. 4 is a detail view of the segmental rack with its offsets for operating the tying device; and Figs. 5, 6, 7, and 8 are detail views of various parts of the machine, to which reference will be made in describing and pointing out the operation of the said parts.

Similar letters of reference indicate corresponding parts in all the figures.

My invention has relation to that class of grain-binders in which twine is used for binding the gavel; and it consists in the construction and combination of parts of the needle and the tying device contained therein, as hereinafter more fully described and claimed.

The object of my invention is to construct a twine-binder which shall consist of few and simple parts, simply put together, so as to make it strong, durable, and not liable to get out of order. Most devices of this class are very complicated in their structure, which not only increases their cost, but causes their operating parts to wear rapidly, so that the machines frequently get out of order and require repairs constantly. I have endeavored to overcome these drawbacks to the general introduction of twine-binders, and have produced a binder which can be made at a comparatively small cost, and which will always be found to work satisfactorily and without "kinks" or hitches of any kind. At the same time my improved binder is adapted for use on any of the leading makes of harvesters, proper gearing being provided for operating it by the drive-wheel of the machine in the usual manner.

In the accompanying drawings, the letter A represents the cradle or receptacle of the cut grain which is to form the gavel. Above this, journaled in a suitably-constructed frame, B, is the drive-shaft C, upon which the binder-arm D is keyed or otherwise fastened, the outer end of which carries the head or needle E. This consists of a body of pyramidal shape, terminating in the point $e$, and having a cap or plate, $c$, overlapping the pivoted dog or twine-clamp F.

Inserted in a chamber or recess in the body of the needle is a block, G, the under side of which has a centrally-apertured circular pocket or recess, $g$. The knotting device or "tyer," which operates in and in conjunction with this pocket, consists of two parts—viz., the rotary slotted hook H and the reciprocating crosshead I. The former, as will be seen from the drawings, is in the shape of a blunt hook, and has a slot, $h$, running from point to heel and extending up into its shaft or arbor H', which is journaled in the central aperture of the circular pocket $g$ in the block or plate G. Arbor H' has a pinion, K, through the hollow center of which is inserted the stem I' of the crosshead I. The latter works in the slotted hook H, and has a lip, $i$, at its reduced outer end or toe which points in the direction of the point of hook H, while its heel or enlarged end $i'$ projects backward through the slots $h$ and $h'$ in the part H H'. The stem I' of the part I extends up through an aperture in the top plate, $c$, its projecting upper end engaging a spring, L, the tension of which operates to draw the part I up through the slots $h h'$ of part H H' into the circular pocket $g$.

To the under side of needle E is fastened the guard-plate M, which has a slot, $m$, on one side, the function of which is to guide the cord to the tyer. The cord is held by the pivoted dog or twine-clamp F, which has its fulcrum on a pin, $f$, on the under side of the overlapping cap-plate $c$. A metal or rubber spring, $a$, of any desired construction, is inserted between the curved rear end, F', of the clamp and the appropriate side of the needle, and operates to press the outer end or lip, b, of the clamp up against the side of the needle-head, so as to firmly hold or clamp the end of the tying cord or twine between it and the needle-head.

Across the top plate, c, is fixed a guide-plate, N, which is turned down at its projecting end to form a lip or flange, n, the object of which is to guide the needle-head on the segmental rack which actuates its operating parts. This rack (shown at O) is suitably fastened to the machine, and is cast with projecting or overhanging flanges P and P', which are separated by the open space s. The ends of flanges P and P', facing the opening s, are curved upwardly or outwardly, as shown at p and p', Fig. 4, and the back part of the rack itself is grooved to form a channel, o, (see Fig. 8,) in which lip n of the guide-plate N is guided in operating the machine.

The device for cutting the twine, and also the device for discharging the sheaf from the cradle, are shown respectively at Q and R, and will be described in explaining the operation of the machine, which is as follows: The needle is threaded by clamping the free end of the twine or tying-cord T between the lip or bill b of the spring dog F F' and the side of the needle-head, as shown in Fig. 1 of the drawings. From its spool (shown at S) the twine passes over the combined guide and tension-pulley V up to the needle, as shown. The gavel is deposited in the cradle A, and as shaft C revolves the binder-arm D and needle E are carried with the twine around the gavel, the twine being crossed as the needle on its upstroke passes the tension-pulley V. A little above this point the needle meets and engages the lower end of the segmental-rack O, and here the operation of tying the knot commences. At this stage the two strands of the tying-cord (formed by the crossing of the cord) are lying across the toe i of the cross-head I, being guided into this position by the guide-slot m in plate M, and as hook H, actuated by its pinion K, rotates a loop is partially formed around the tubular stem or arbor H' of the hook and over the toe i. At this stage, and while the hook is still revolving, that part of the loop over the toe i is drawn up into the pocket g as cross-head I is forced up by the action of spring L. As the stem I' of the cross-head strikes the upper overhang, p P, its heel i' will force the loop that has been formed around arbor H' off the heel of hook H, and simultaneously with this action the cord is cut and the ends held by toe i, and by the expulsion of the gavel the loop is drawn off the hook and tightened to form the knot as it slips the hook. The twine is cut by the sharp lip or cutter q of a standard, Q, fixed upon the frame in proximity to rack O, and as it is cut back of the twine-clamp or spring-dog F F' the needle will remain threaded, with the free end of the twine ready for tying the next gavel. After the sheaf has been tied it is thrown off from the cradle by a fingered hook, r, at the upper end of a standard, R, suitably fastened to one side of the machine, the bound sheaf being carried against the hook by the upward motion of the gooseneck, which carries it with it.

From the foregoing description it will be seen that this binder is exceedingly simple, both in construction and operation. It ties a simple knot with a single twine doubled around the gavel, cuts the doubled twine, and discharges the bound sheaf with a mechanism consisting of fewer and less complicated parts than any other binder with which I am acquainted.

Having thus described my invention, I claim and desire to secure by Letters Patent of the United States—

The combination, in a grain-binder adapted to bind with twine, of a needle or twine carrier having the rotary slotted hook H, provided with a tubular arbor, H', and actuating-pinion K, the cross-head I, and stem I', working in the tubular arbor, spring L, block G, forming a bearing for the rotary twister-arbor, and having circular pocket g, spring-dog or twine-holder F, and mechanism for operating the rotary pinion and the reciprocating stem of the tyer, all constructed, combined, and arranged to operate substantially in the manner and for the purpose herein shown and set forth.

In testimony that I claim the foregoing as my own I have hereunto affixed my signature in presence of two witnesses.

JOHN H. O'HARA.

Witnesses:
GEORGE E. JOHNSON,
GUERNSEY A. CURTISS.